United States Patent [19]

Elser et al.

[11] Patent Number: 5,107,752
[45] Date of Patent: * Apr. 28, 1992

[54] ROTARY GATE VALVE FOR HYDRAULIC SERVO-ASSISTED STEERING SYSTEMS

[75] Inventors: Dieter Elser, Essingen; Helmut Hetzel, Schwäbisch Gmünd; Walter Kogel, Abtsgmünd, all of Fed. Rep. of Germany

[73] Assignee: Zahnradfabrik Friedrichshafen, AG., Friedrichshafen, Fed. Rep. of Germany

[ * ] Notice: The portion of the term of this patent subsequent to Feb. 11, 2009 has been disclaimed.

[21] Appl. No.: 328,035

[22] PCT Filed: Sep. 16, 1987

[86] PCT No.: PCT/EP87/00523
  § 371 Date: Jan. 31, 1989
  § 102(e) Date: Jan. 31, 1989

[87] PCT Pub. No.: WO88/01958
  PCT Pub. Date: Mar. 24, 1988

[30] Foreign Application Priority Data

Sep. 19, 1986 [LU] Luxembourg ............. 86/00542

[51] Int. Cl.$^5$ .................. F15B 9/10; B62D 5/06
[52] U.S. Cl. .................. 91/375 A; 137/625.24; 180/149; 180/143
[58] Field of Search ........... 91/47, 51, 375 A, 375 R; 180/141, 142, 143, 144; 137/625.24, 625.3, 625.31, 625.32

[56] References Cited

U.S. PATENT DOCUMENTS

| | | | |
|---|---|---|---|
| 2,992,633 | 7/1961 | Stiglic et al. ............ | 91/375 R |
| 4,173,987 | 11/1979 | Kouda ............... | 180/143 |
| 4,561,516 | 12/1985 | Bishop et al. ............ | 137/625.17 X |
| 4,756,330 | 7/1988 | Tischer ............... | 137/625.35 X |
| 4,765,428 | 8/1988 | Kawakami et al. ............ | 91/375 A X |
| 4,784,235 | 11/1988 | Ijiri et al. ............... | 180/143 X |
| 4,830,130 | 5/1989 | Miyoshi ............... | 180/141 |
| 4,858,712 | 8/1989 | Neff ............... | 137/625.32 X |

FOREIGN PATENT DOCUMENTS

| | | | |
|---|---|---|---|
| 0295796 | 12/1988 | European Pat. Off. ............ | 180/149 |
| 2579548 | 10/1986 | France ............... | 180/149 |
| 2031826 | 4/1980 | United Kingdom ............ | 91/375 A |

Primary Examiner—Edward K. Look
Assistant Examiner—John Ryznic
Attorney, Agent, or Firm—Albert M. Zalkind

[57] ABSTRACT

An auxiliary power steering mechanism has a rotary valve that includes a rotary member integrally formed with the steering shaft of the vehicle and a fixed valve sleeve integrally formed with a threaded spindle. The rotary member contains a plurality of radial hydraulic fluid return bores arranged in two parallel rows with the bores of each row being spaced longitudinally. A guide groove in the valve sleeve, which is connected with a power cylinder, is assigned to each row of bores. An additional radial return bore is arranged in the middle of the two rows of bores and has a fixed residual cross section. All of the return bores include flat portions of different circumferential lengths to control the build-up of pressure in a surge chamber. The hydraulic return cross section produced by the bores is varied by a piston valve arranged in a concentric bore in the rotary member. The piston valve can be adjusted as a function of a pressure in accordance with speed. Operating forces at the steering wheel that are synchronized with the drive situation at the moment are obtained by changing the cross section of the row of bores in an open operating condition at that moment for setting the pressure of the rotary valve.

9 Claims, 8 Drawing Sheets

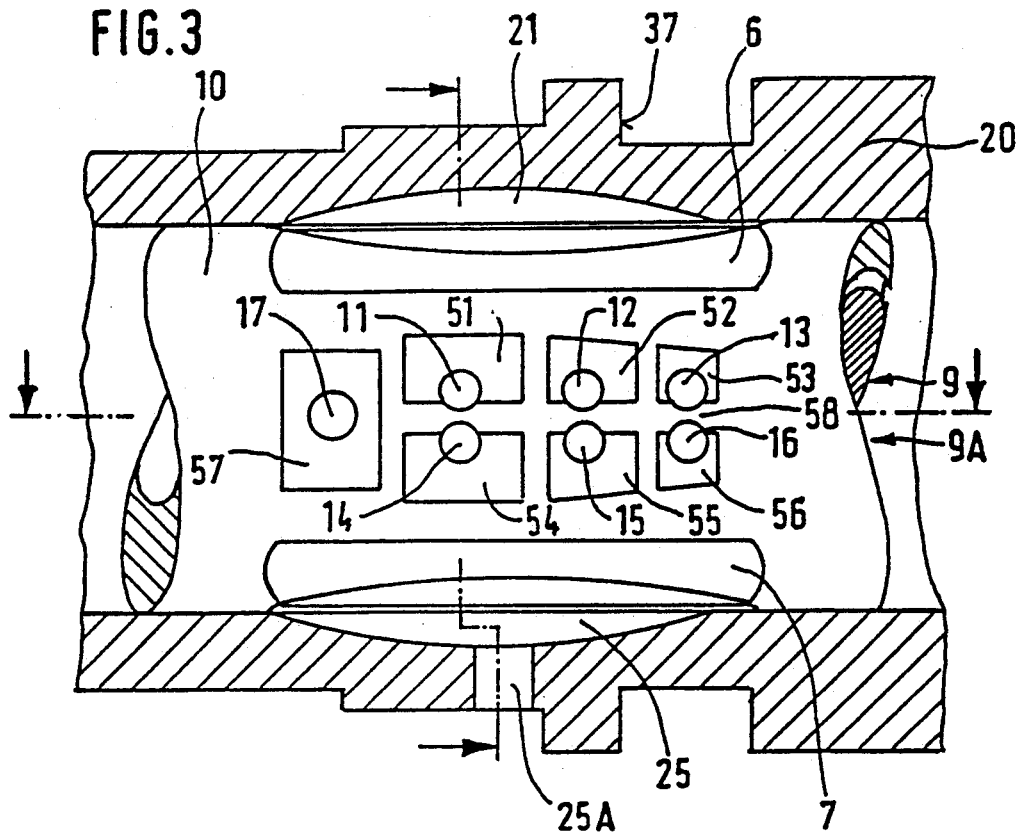
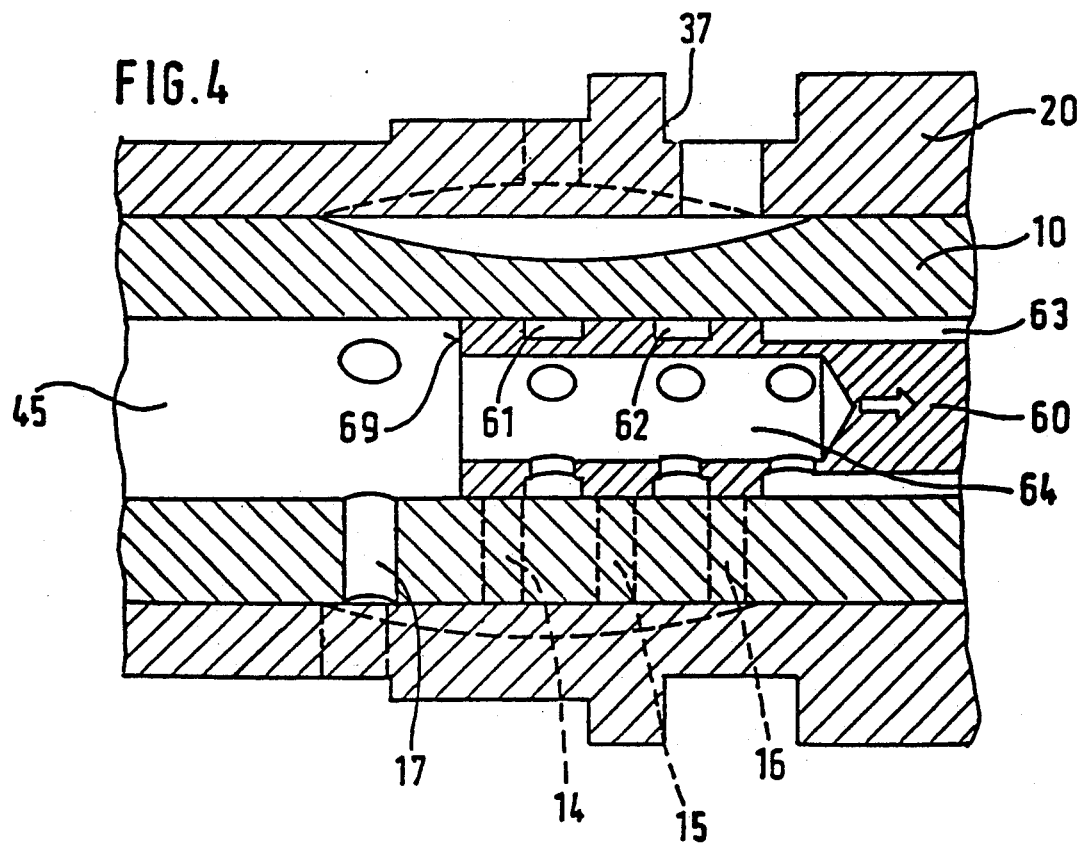

ROTARY GATE VALVE FOR HYDRAULIC SERVO-ASSISTED STEERING SYSTEMS

BACKGROUND OF THE INVENTION

The invention is concerned with a rotary slide valve for hydraulic auxiliary power steering mechanisms of motor vehicles.

Auxiliary power steering mechanisms are designed so that the valve's characteristic curve (working pressure-operating power characteristic curve) has a flat, gradual ascent in a relatively large angle of rotation range of the rotary slide valve, and then rises steeply to a maximum value as the operating power further increases. So the driver must turn the steering wheel through a relatively large angle of rotation, when parking and maneuvering, for example, until a greater intensification of power is reached. The two rotary slide valve elements elastically connected with each other by the torsion bar rotate against each other within this angle of rotation. Depending upon the cross-section and length of the torsion bar, the driver must apply more or less a large amount of operating power until the rotary slide valve triggers the desired intensification of power. Such a valve characteristic curve, with initially flat ascent through the angle of rotation, makes straight-line travel characteristics possible at higher speeds since the auxiliary power portion remains small and the response within the elastic area of the torsion bar permits a good steering touch. However, the fact that the operating power is relatively high in the slow-travel range is a disadvantage of the characteristic curve characteristic that is synchronized with an exact steering behavior at high speeds.

A rotary slide valve that accomplishes the controlling of pressure so that the opposing demands for lower operating power in the slow-travel range and high operating power at fast speeds can be satisfied is already known from EP 01 71 247 A2. This known rotary slide valve is a structural part of a rack-and-pinion steering mechanism in which the rotary slide member connected with the steering shaft is connected with the pinion engaging with the steering rack by the torsion bar. The valve sleeve surrounding the rotary slide member is likewise coupled with the pinion in the direction of rotation with a steering play, but guided axially and displaceable on the rotary slide member. One face of the valve sleeve rests against a spring in the housing while a surge or pressure chamber is attached to its other face. This surge chamber lies between the radial return drilled holes or bores in the rotary slide member and the return connection leading to a container. An electromagnetically activated adjustment throttle is installed in the return connection that controls the return cross-section as a function of the speed of travel. In rapid travel, the adjustment throttle is wide open, so that the oil can flow unhindered to the return connection. Therefore the valve sleeve remains on the rotary slide member in its initial position, determined by the spring, so that the guide grooves and the guiding edges of the rotary slide valve corresponding thereto are available for regulating the pressure along their entire length. This means a characteristic curve path with a gradual increase of pressure over a relatively large angle of rotation range and the further steep increase of pressure only toward the end of the relative rotation of the two parts of the rotary slide member to each other.

At slow speed (i.e. during parking), the cross-sectional area of the aperture at the adjustment throttle is narrowed down sharply. As a result, a differential pressure builds up in the surge chamber of the valve sleeve that moves it into final position against the spring resistance. The effective guiding edge length of the rotary slide valve is shortened, so that the original characteristic curve of the rotary slide valve is changed. The torsion angle between the two rotary slide elements needed for regulating the pressure is smaller since the building up of pressure in the active pressure chamber of the working cylinder takes place much faster. This is a result of the reduced regulating cross-section. Since the torsion bar consequently must only be rotated through a small amount of angle, the operating power at the steering wheel is also correspondingly smaller. Now the steering power characteristic curve has a very steep path through the angle of rotation. Between the two positions of the valve sleeve that were described—that is, the initial position and the final position—any intermediate position of the valve sleeve at all is possible as a function of the variable differential pressure. In this way, the valve characteristic curve can be adapted to the driving situation at the moment. For better synchronization of the characteristic curve, the guiding edges of the known rotary slide member are provided with short pockets that gradually change into long control slots. The peripheral length of the pockets is larger than the slots.

This known oil return control system for changing the valve characteristic curve is only suitable for steering devices with a separate valve sleeve. In steering gears in which the valve sleeve is connected with another transmission part for structural reasons, the return control system that has been described cannot be used. As a result of the great length of packing on their outer circumference, such axially displaceable valve sleeves work with hysteresis in the application of pressure.

SUMMARY OF THE INVENTION

Therefore it is the object of the invention to provide a generally applicable return control system. Thus the return control system is to be usable both in connection with coupled valve sleeves and with sleeves arranged separately.

According to the main feature of the invention, the return drilled holes in the rotary slide member are arranged separately, one behind the other, in the longitudinal direction for any direction of rotation, so that two rows of drilled holes lying close to each other result along the circumference in every case. Each row of drilled holes is assigned to a guide groove in the valve sleeve connected with the servomotor. A piston valve is installed for displacement in the concentric drilled hole in the rotary slide member for changing the return cross section. Therefore a larger or a smaller return control cross section is available, depending upon the position of the position valve, so that different operating powers are obtained at the steering wheel. Optimally synchronized operating powers can also be produced at all driving speeds by this means with a rotary slide valve with an axially undisplaceable valve sleeve. Here the piston valve sealing metallically in the rotary slide member provides the advantage of a functioning with little hysteresis.

The piston valve member has a blind-end drilled hole that is open toward the concentric drilled hole in the rotary slide member so that the return oil can flow off unhindered. Annular grooves connected with the blind-end drilled hole have been introduced into the outer surfaces of the piston valve at about the spacing of the radial return drilled holes provided in the rotary slide member. These annular grooves can be moved to a part of the return drilled holes so that the return is partially or completely blocked. The free end of the piston valve also serves the purpose here of controlling a number of return drilled holes lying in a common plane of cross section. In this way, a return cross section that is changeable in a large area is obtained. Another return drilled hole with a residual cross section that is not controllable—i.e., constantly open—lies next to and in the middle of two rows of drilled holes lying next to each other. The entire return control system is integrated, safe to operate and space-savingly, in the rotary slide valve. According to another feature of the invention, the return drilled holes are surrounded by windows that are produced by stamping. These windows have different widths and circumferential lengths, with some of the windows having a sloping outer contour. The windows shaped in this way have the task of carrying out the distribution of the discharge to the drilled hole cross section still open at the moment so that the desired characteristic curve change takes place. Furthermore, the windows ensure that the pressure is reduced over a relatively long flow route. The rows of drilled holes with the windows that go with them are separated from each other hydraulically by an arm running longitudinally. By this means, it is guaranteed that, whatever the direction of rotation of the rows of drilled holes, two of which always lie side by side, only one of them always takes over the exact regulation of pressure—i.e., that bypass streams are avoided. Further, it is important that the centrally located, not controllable return drilled hole and the window that goes with it are operative in both directions of rotation.

The piston valve advantageously has an annular attachment for the application of pressure that, together with the rotary slide member shuts off a surge or pressure chamber. This pressure chamber is connected with a pump driven on the output side that delivers the actuating pressure that depends upon the speed. A throttle is installed downstream from the pressure chamber so that a differential pressure can build up in the pressure chamber.

A new characteristic curve between the boundary characteristic curves generated in the initial position and final position of the piston valve is obtained by the changeable return cross section system at every intermediate position of the piston valve. Since the pump makes a stream of constant volume available, the system always has the full safety of operation of a conventional auxiliary power steering mechanism, for the stream of maximum volume is immediately available.

The oil-return control principle according to the invention can also be used advantageously on auxiliary power steering mechanisms with two hydraulic steering circuits separated from each other. Such two-circuit steering mechanisms offer a great deal of safety in heavy vehicles, which would not be steerable any longer without auxiliary power. Two-circuit steering mechanisms with two rotary slide valves axially one behind the other are generally known (for example, DE-PS 29 18 975). Each of these rotary slide valves distributes the pressure oil delivered by two separate pumps to separate working cylinders, so that a first and a second steering circuit (emergency steering circuit) are available. The two pumps can depend upon the engine for propulsion, but it is often advantageous to have the pump of the second steering circuit depend upon driving speed for propulsion, so that the vehicle can be pulled out of traffic by means of the second steering circuit even if the engine fails. The oil-return control system of the invention is located in the rotary slide of the rotary slide valve belonging to the first steering circuit, with all individual features of the cross-section-changing process being made use of there, too, with the assistance of the displaceable piston valve. In contrast with the single-circuit steering mechanism referred to initially, however, the axial adjustment of the piston valve is not accomplished by an additional pump depending upon driving speed, but by the pump of the second steering circuit driven on the output side that is already present. It is only necessary, for this purpose, to extend the piston valve through the second rotary slide and provide it with an annular attachment that in turn, together with the second rotary slide, forms a pressure chamber. The volume of oil flowing almost unpressurized through the second rotary slide valve in waiting operation now serves the purpose of controlling the first steering circuit's oil return. When the steering mechanism is fully intact, the first steering circuit applies the required supplementary power alone. On the other hand, if the first steering circuit is incapacitated, because of a broken line, for example, the vehicle can be gotten out of traffic with some increase in the driver's physical effort and without the advantages of the reverse control mechanism, which only works on the first steering circuit.

In another embodiment, an electrically-activated flow control valve is installed in the return stream, downstream, behind the piston valve, that produces a dynamic pressure acting on a face of the piston valve. In this way, it is possible to attune the valve characteristic curve with regard to various influencing variables-useful load, transverse acceleration and speed, for example. With a relatively simple design, this arrangement has a high degree of operational safety.

BRIEF DESCRIPTION OF THE FIGURES

Further details concerning the invention are made clearer from a study of the following specification when viewed in the light of the accompanying drawing, in which:

FIG. 3 shows a sharply enlarged partial longitudinal section of the rotary slide valve with the casing omitted;

FIG. 4 shows a longitudinal section along the line 4—4 in FIG. 3 with the piston valve in the initial position for minimal operating power;

DETAILED DESCRIPTION

Figure 1:
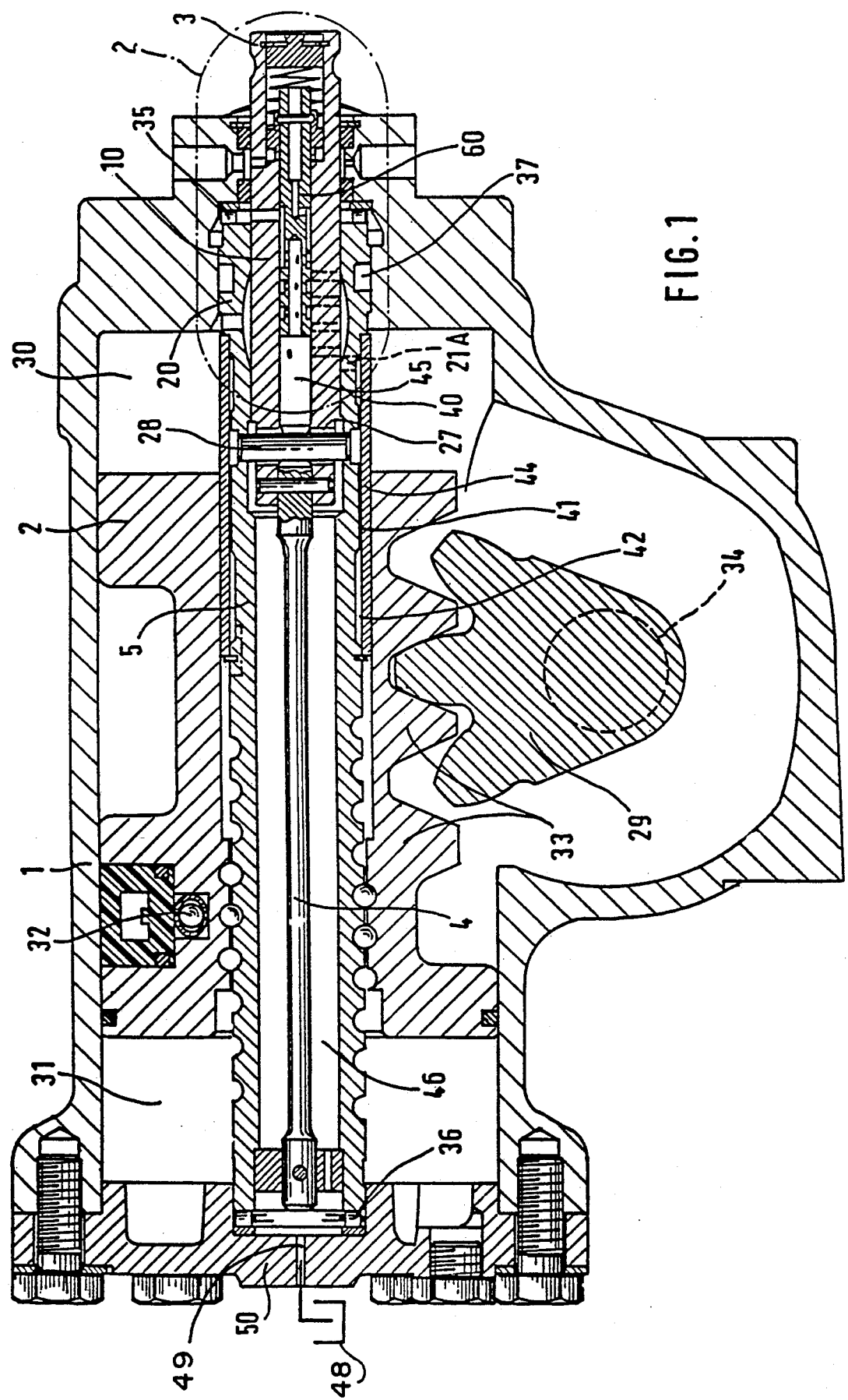
FIG. 1 shows a longitudinal section through a block steering mechanism with working cylinders fitted therein.

FIG. 1 shows a block steering gear with a working piston 2 fitted into a transmission casing 1. A steering shaft 3 that carries a steering wheel (not shown) is connected with a threaded spindle 5 by a torsion bar 4. As can best be seen in FIG. 5, the steering shaft 3 includes three axial supply guide grooves 6, 7, 8 at equal angular distances from each other, for example, that belong to a rotary slide member 10. Between these guide grooves 6 to 8, in each case, are two rows 9 and 9A of return drilled holes or bores located one behind the other in the longitudinal direction, and in FIG. 3 these are return drilled holes 11 to 13 and 14 to 16. In the middle of these two rows is another return drilled hole 17 with larger diameter. The more exact shape of this arrangement of drilled holes and its functioning will be gone into in detail later on.

The rotary slide member 10 works together with valve sleeve 20 with axial guide grooves 21, 22, 23 and 24, 25, 26 (FIG. 5) that is manufactured in one piece with the threaded spindle 5. The rotary slide member 10 and the valve sleeve 20 are the structural elements of a rotary slide valve that is usual in such auxiliary power steering mechanisms. A transverse bolt 28 fixed in the threaded spindle 5 and passed through a drilled hole 27 in the steering shaft 3 in the direction of rotation, with play, locates a specific control path between the steering shaft 3 and the threaded spindle 5 (FIG. 1). Within this control clearance, the rotary slide valve controls a pressure in a surge or pressure chamber 30, 31 in the working piston 2 according to the direction of rotation. The working piston 2 engages the threaded spindle 5 through an endless bead chain 32 and remains engaged with a steering-worm sector 29 located on a steering worm sector shaft 34 by means of a gearing 33. Axial bearings 35 and 36 serve the purpose of receiving the axial forces acting upon the threaded spindle 5. A pump P driven by a motor vehicle's engine can be connected with the guide grooves 21, 22, 23 and 24, 25, 26 (FIG. 5) in the valve sleeve 20 by an annular groove 37 in the valve sleeve 20 (FIG. 2) and the supply guide grooves 6, 7, 8 in the rotary slide member 10. For the sake of simplicity, only the guiding edges 6A and 6B of the supply guide groove 6 are shown in the drawings. The guide grooves 21, 22, 23 are connected with the pressure chamber 31 by radial drilled holes—21A, for example—belonging to them and the guide grooves 24, 25, 26 are connected with the pressure chamber 30 by corresponding radial drilled holes—25A, for example. It can be seen in FIG. 1 how the connection with the pressure chamber 31 runs in the steering gear: The oil's path leads from the radial drilled hole 21A into annular slots 40, 41, 42 between a tube 44 and the threaded spindle 5 and finally into this pressure chamber 31 by way of the spindle screw thread.

A concentric drilled hole 45 in the rotary slide member 10 is connected with an interior space 46 in the threaded spindle 5 by the drilled hole 27 of the transverse bolt 28. This interior space 46 is discharged to a container 48 through an outlet connection 49 in a cover 50. Every return drilled hole 11 to 17 of the system that can be seen in FIG. 3 has a window 51 to 57 with a very flat throttle cross-section for controlling the pressure. These windows are of different widths and also have different effective lengths because of their sloping outer contour. The window 57 of the return drilled hole 17 for the unchangeable residual cross section has the shortest circumferential length. The return drilled holes 11, 12, 13 and 14, 15, 16 and the windows belonging to them are separated from each other hydraulically by an arm 58. The system of the return drilled holes is repeated on the rotary slide member 10 a total of three times in the chosen example of an embodiment. However, for easier understandability, the invention is only explained in detail and provided with reference numbers on the basis of one drilled hole system.

According to FIG. 4, an axially movable piston valve 60 with two short annular grooves 61, 62 and one long annular groove 63 is guided in the concentric drilled hole 45 of the rotary slide member 10. The annular grooves 61, 62, 63 are connected with the container 48 by a blind-end drilled hole 64 in the piston valve 60, the concentric drilled hole 45 and the interior space 46 of the threaded spindle 5. Furthermore, the long annular groove 63 also is connected with the container 48 over another return path-specifically, a radial drilled hole 65 (FIG. 2), the axial bearing 35 and through a casing return groove 66. The annular grooves 61 and 62 always work together with the return drilled holes 12, 13 and 15, 16 according to the position of the distributing slide valve 60. The face 69 of the piston valve 60 facing the torsion bar 4 opens or closes the return drilled holes 11, 14. The return drilled hole 17 is no longer engaged by the piston valve 60—i.e., it constitutes a permanently open residual cross section.

Figure 2:
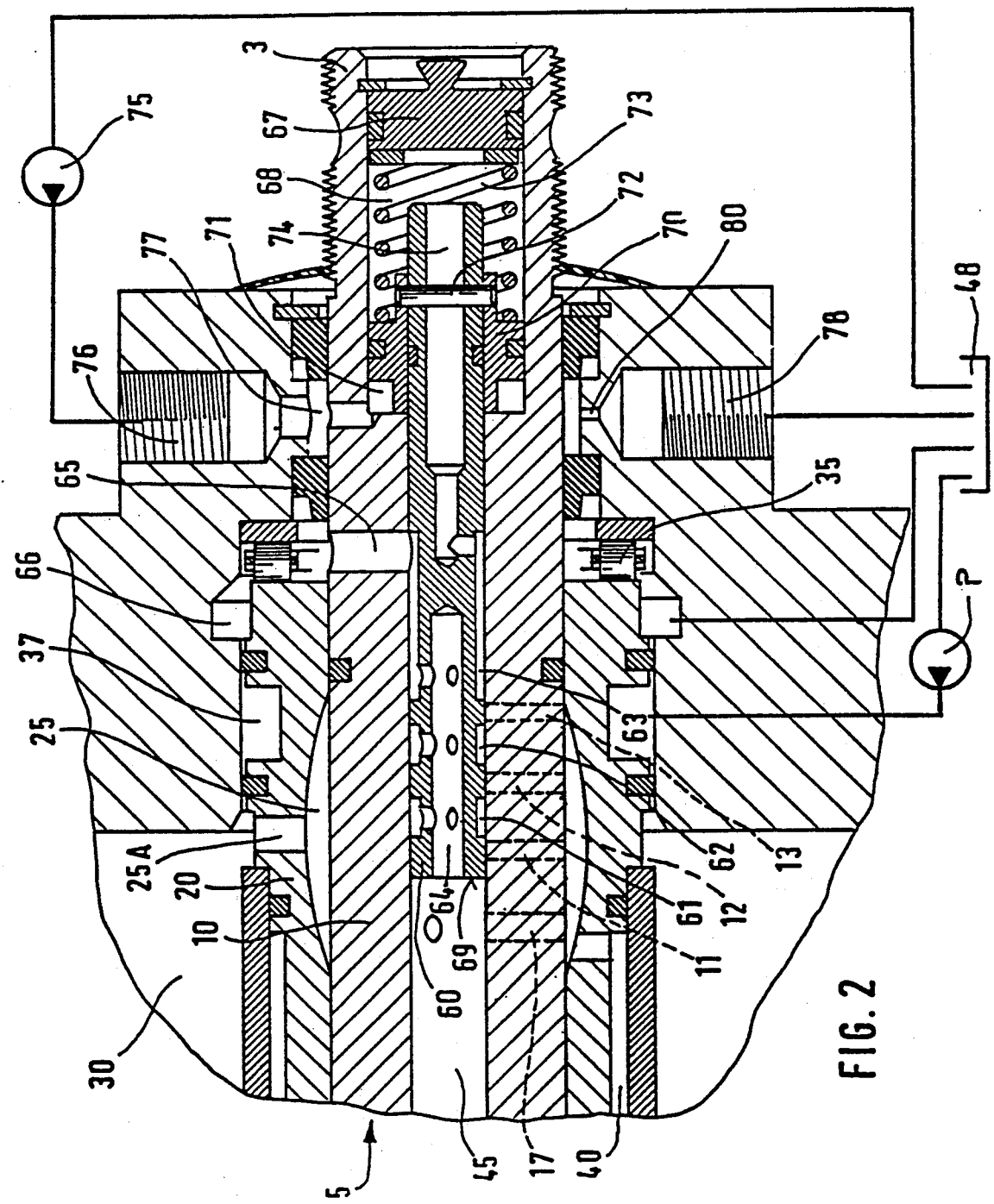
FIG. 2 shows an enlargement of the section of the rotary slide valve encircled by the dash-dot line 2 in FIG. 1.

According to FIG. 2, the piston valve 60 at the end of the steering shaft 3 projects into a space 68 closed by a stopper 67. In this space 68, the piston valve 60 bears an annular attachment 70 that, with the rotary slide member 10, closes off a ring-shaped pressure chamber 71. The annular attachment 70 is fastened to the piston valve 60 by means of a pin 72. A spring 73 holds the piston valve 60 in the initial position that is shown. A second axial drilled hole 74 in the piston valve 60 connects the space 68 with the annular groove 63 and with the return flow, which has already been described. Thus no pressure can be built up in this space 68. A pump 75 driven on the output side—by a transmission output shaft, for example—is connected with the pressure chamber 71 by a connection 76 and an annular groove 77. A throttle 80 that produces an actuating pressure in the pressure chamber 71 is provided in the direction of flow behind the pressure chamber 71 and in front of an outlet 78.

Figure 5:
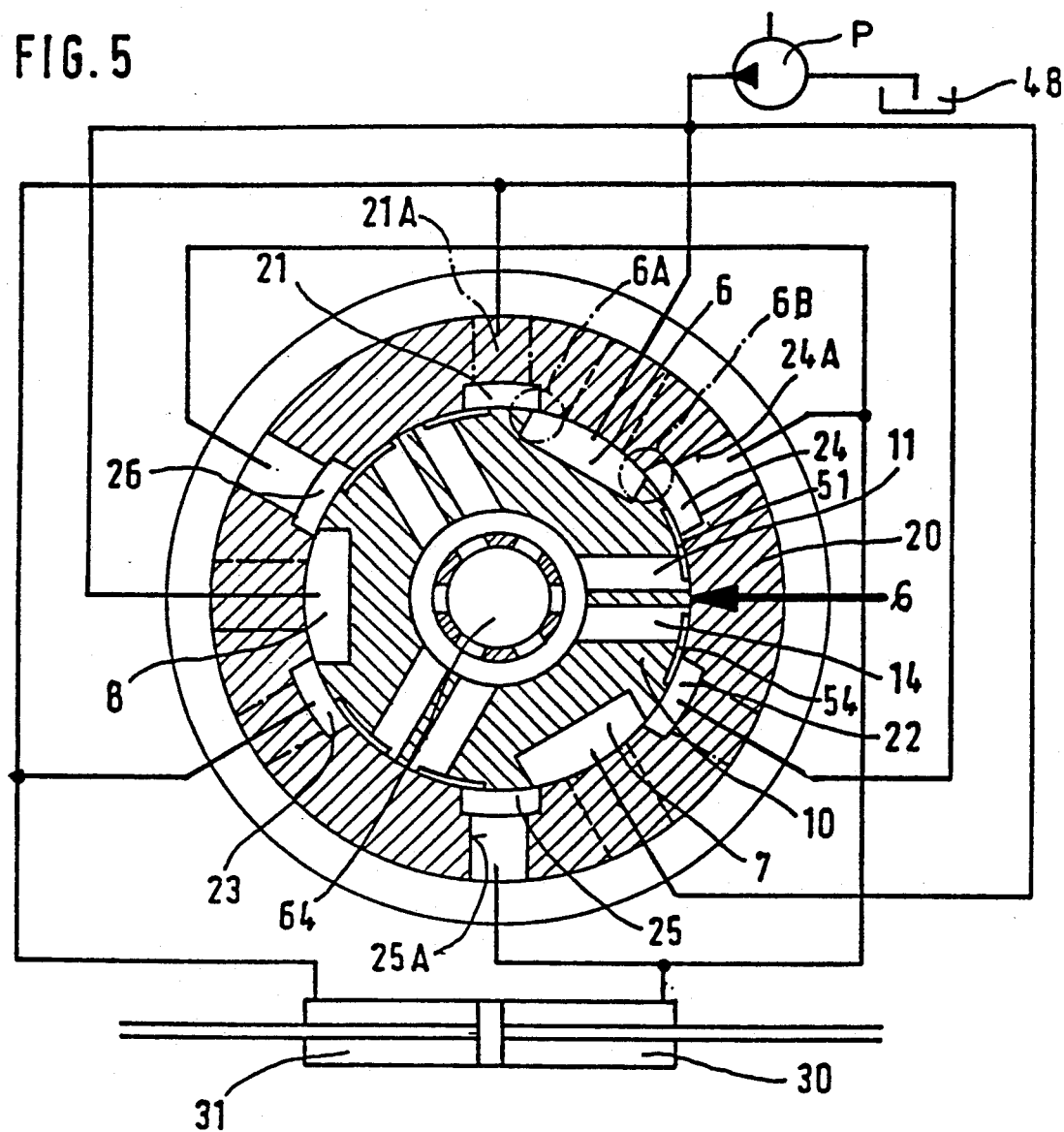
FIG. 5 shows a cross section through the rotary slide valve in neutral position along the line 5—5 in FIG. 3.

The rotary slide valve works as follows: In FIG. 5, the rotary slide valve is shown in its neutral position—i.e., it is not triggering any pressure. The vehicle's engine is running, but the vehicle has only a little driving speed. The feed stream of the pump 75 is still not producing sufficient pressure in the pressure chamber 71, so that the spring 73 is keeping the piston valve 60 in the initial position shown in FIG. 2 and FIG. 4. Consequently, the flow of pressure oil inside the rotary slide valve is again shown at only one of the three guide groove and drilled hole systems that work together.

The pressure oil conveyed into the supply guide groove 6 by the engine-driven pump 36 can flow away over the guiding edges 6 A and 6 B, which are open on both sides. The pressure oil flows through the guide groove 24, located clockwise to the right, to the windows 51, 52, 53 and 57, for example. However, since the rotary slide member 10 still remains in its initial position, the return drilled holes 11, 12, 13 are blocked, so that no presssure oil flows away through the windows 51, 52, 53 belonging to them. Only the somewhat larger return drilled hole 17, to which the pressure oil flows through the window 57, is open. The oil flows back to the container 48 from the return drilled hole 17 through the drilled hole 45 and the interior space 46 (FIG. 1). Furthermore, the oil can still flow away over the second return path—i.e., the axial drilled hole 64 in the piston valve 60, the annular groove 63, the radial drilled hole 65, the axial bearing 35 and the casing return groove 66 (FIG. 2).

Figure 6:
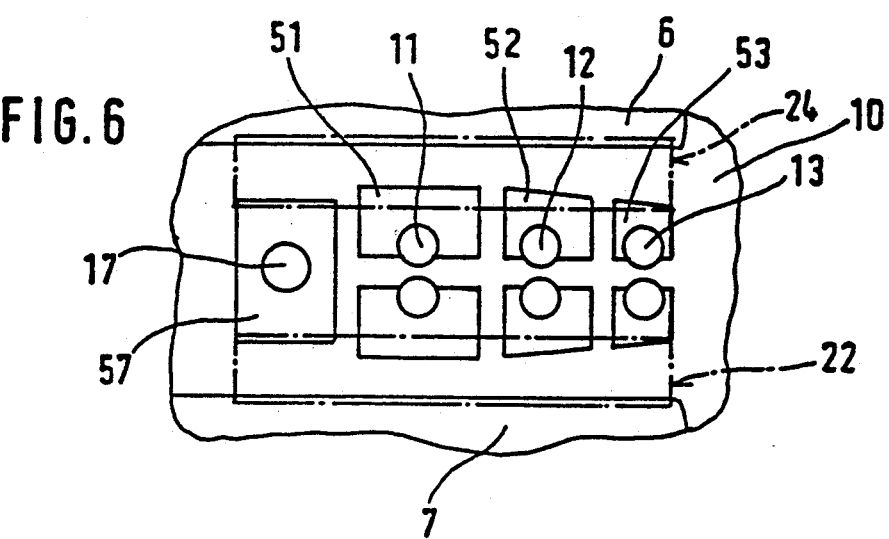
FIG. 6 shows a partial developed view of the rotary slide, viewed in the direction of the arrow 6 in FIG. 5.

The position of the control grooves 22 and 24 in relation to the windows 51, 52, 53 and 54, 55, 56 and 57 can be seen most clearly in the neutral position in FIG. 6 that has been described.

The guide grooves 22 and 24 (dot-dash line) are cut into all the windows. However, because of the initial position of the piston valve 60 (FIG. 4), a return flow of oil takes place first only from the window 57 to the return drilled hole 17. As soon as the vehicle increases its speed, the differential pressure in the pressure chamber 71 (output-side pump 75) rises and the piston valve 60 moves from the initial position in FIG. 4 (to the right, in the direction of the arrow), in which the annular grooves 61 and 62 correspond with the return drilled holes 12, 13 and 15, 16 and in which the face 69 opens the return drilled hole 11 or 14. The return flow takes place now through all the windows and their more or less open return drilled holes.

Figure 7:
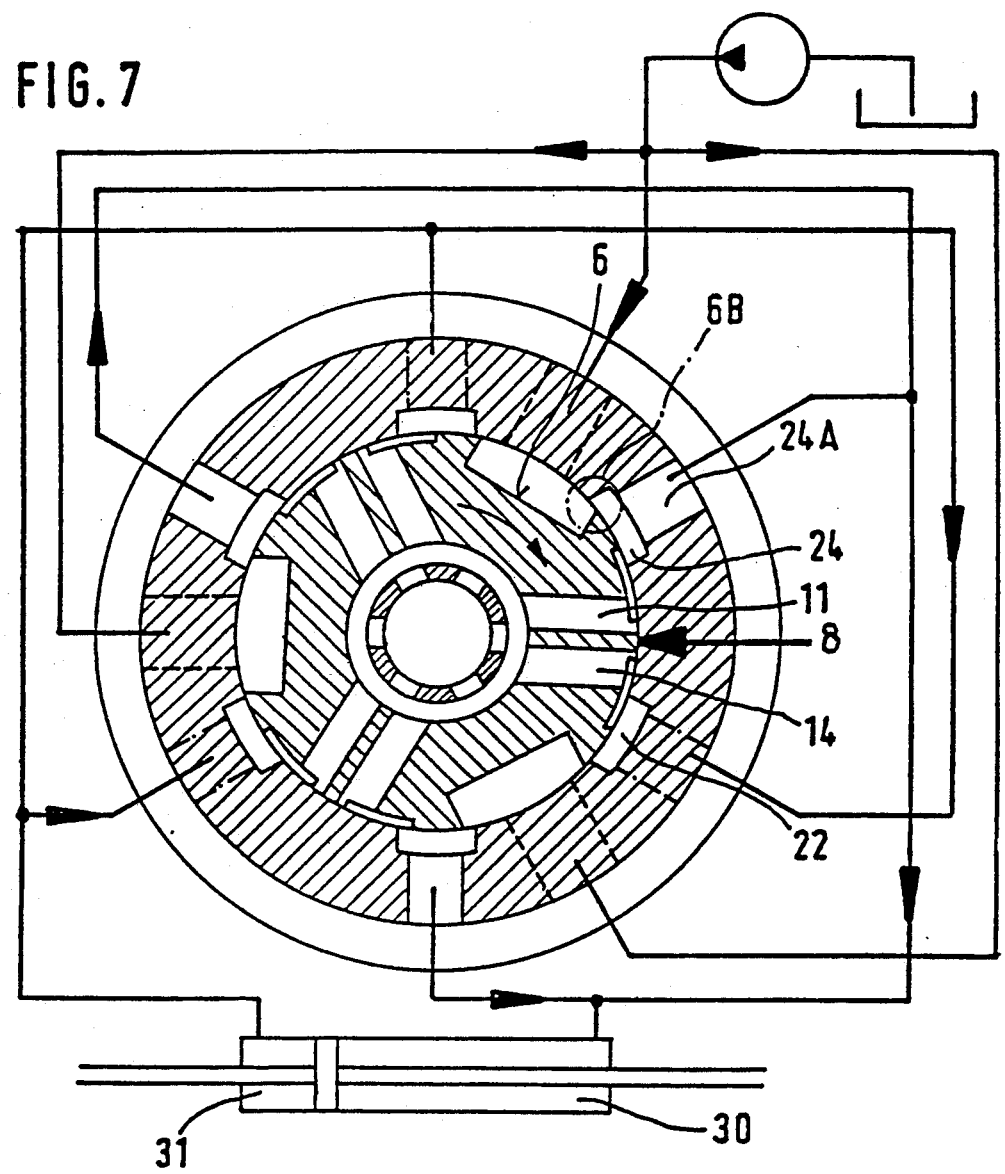
FIG. 7 shows a cross section according to FIG. 5, but in a steering position.
Figure 8:
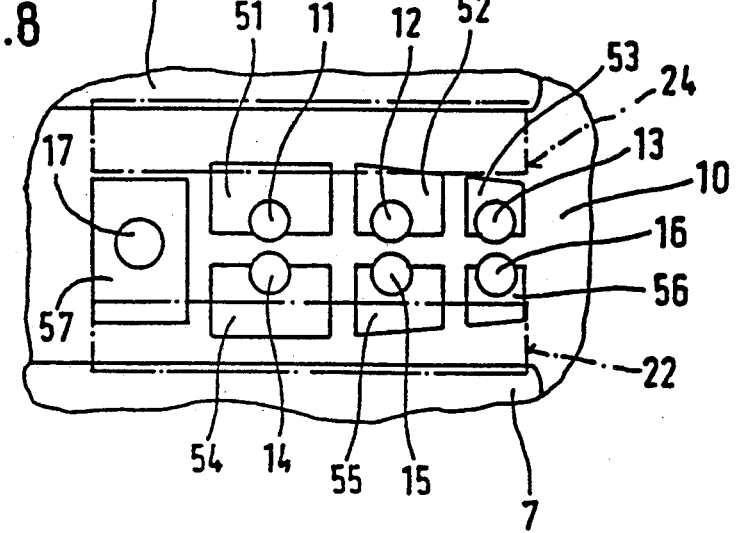
FIG. 8 shows a partial developed view of the rotary slide, viewed in the direction of the arrow 8 in FIG. 7.

FIGS. 7 and 8 show the rotary slide valve in a steering position with the rotary slide member 10 rotated in the direction of the arrow through a certain amount of angle with respect to the valve sleeve 20. The guiding edge 6B is wide open, so that the pressure oil conveyed through the supply guide groove 6 flows into the guide groove 24 and can flow away into the pressure chamber 30 through the radial drilled hole 24A. The gradual build-up of pressure takes place, during this process, as a result of the feeding down of a partial stream through the windows 51 and 52 and through the return drilled holes 11 and/or 12 belonging to them. This is made clear again in FIG. 8. The partial stream that is fed down can flow away into the return drilled holes 11 and 12 from the annular groove 24 through openings at the windows 51 and 52 that are still open. However, the guide groove 24 is not connected with the windows 53 and 57 any longer. Since almost the entire circumferential length of the flat windows 51, 52 is available during this downward feeding, the high pressure can be reduced over a long throttle stretch. No outflow noises arise at the entrance into the return drilled holes 11 and 12.

Assuming that the vehicle is moving at average speed, the piston valve 60 is in an intermediate position (not shown) in which it only unblocks partial cross sections of the return drilled holes 11, 12, 13 by the face 69 and the annular grooves 61, 62. The momentary return cross section resulting from this generates a quite definite operational power at the steering wheel. This operational power is so synchronized in accordance with the speed that it provides the driver entirely adequate supplementary power support simultaneously with good road contact. The pressure build-up that goes along with this operating condition corresponds approximately to characteristic curve W in FIG. 10. The volume of oil pushed out of the other pressure chamber 31 at the same time goes from the guide groove 22, which far overlaps all windows 54 to 57, to the return drilled holes 14 to 17 and can flow away unhindered to the container 48.

If, for example, the vehicle has only a little speed when being parked, the piston valve 60 is in its initial position according to FIG. 4. The drilled holes 11, 12, 13 are completely blocked. When the rotary slide member 10 rotates, the downward feeding still takes place only through the window 57 and the return drilled hole 17. FIG. 8 already shows a position of the guide groove 24 in relation to the window 57 in which no more oil can flow over, the pressure triggering is thus already ended and extreme pressure prevails in the pressure chamber 30. As a result of this initially sharply reduced return cross section only by the window 57 and the drilled hole 17, the supplementary power in the pressure chamber 30 rises sharply—i.e., the rotary slide member 10 must be rotated only through a small angle of rotation with respect to the valve sleeve 20 to trigger a high pressure. Therefore, the operating power at the steering wheel also stays relatively small. When this happens, the rotary slide valve produces an increase of pressure, as is shown by the characteristic curve Y in FIG. 10.

Figure 9:
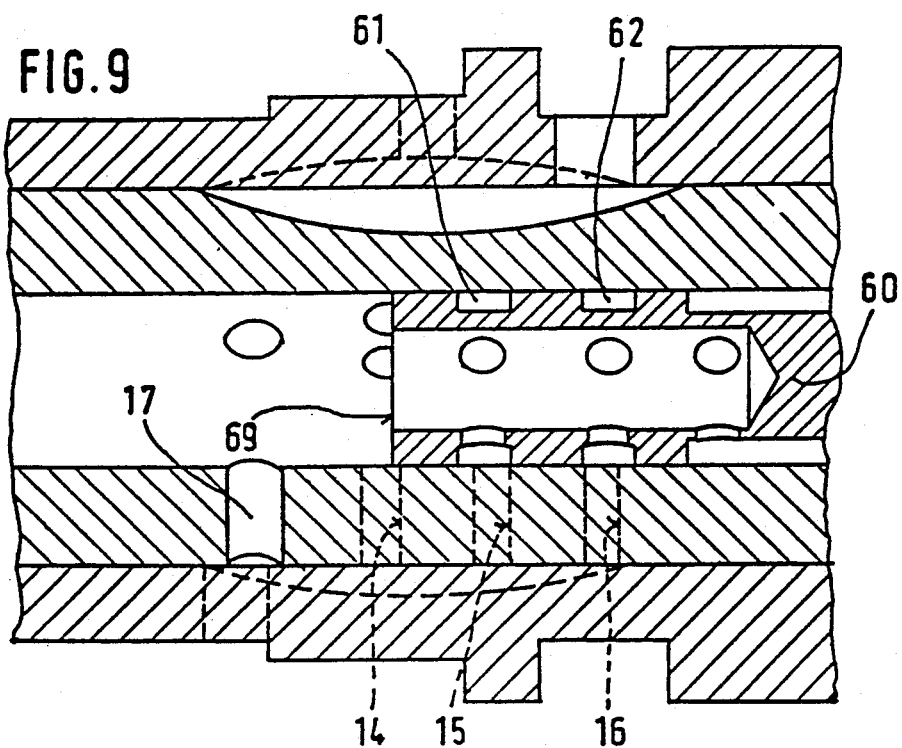
FIG. 9 shows a longitudinal section according to FIG. 4, but in the final position of the piston valve for maximal operating power.
Figure 10:
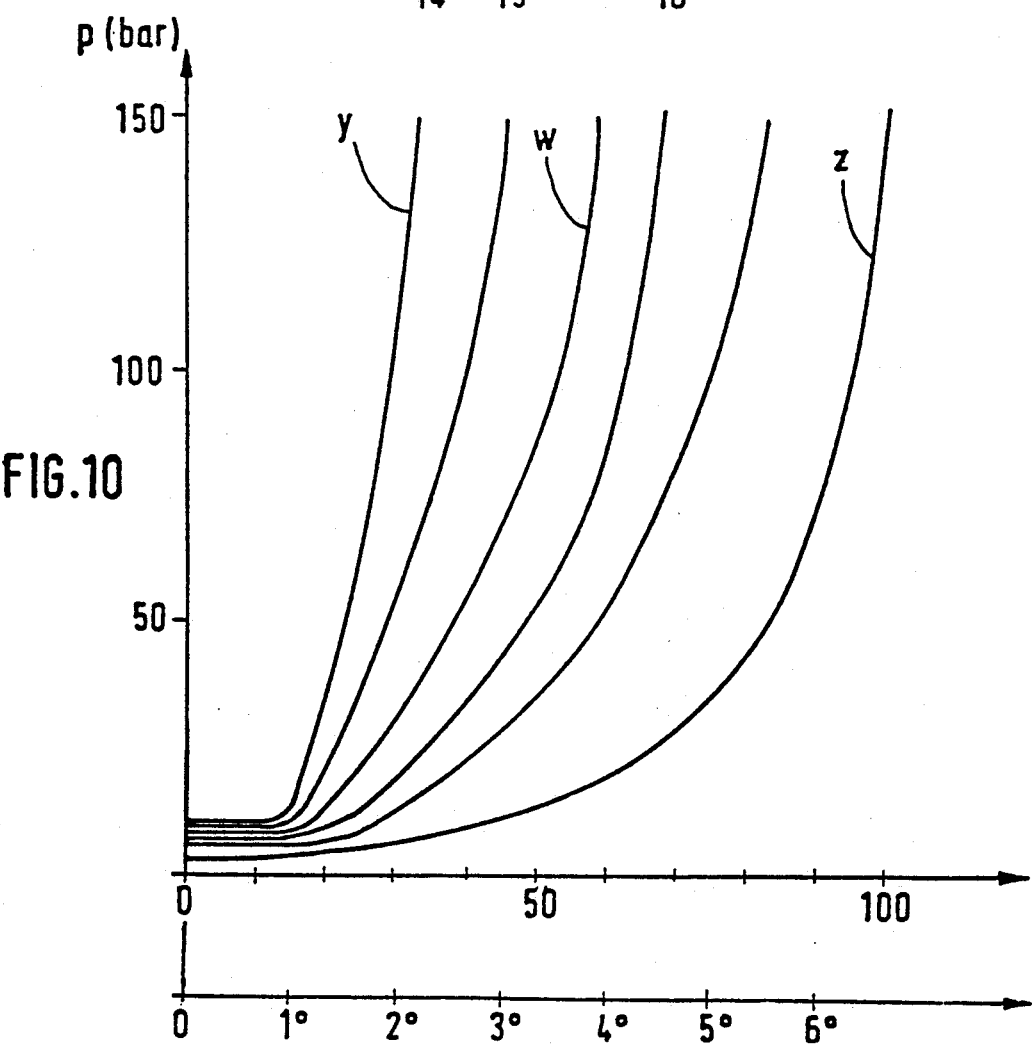
FIG. 10 shows a working pressure-physical effort family of characteristics.

In another assumed operating condition, the vehicle is operating at high speed, at which the driver performs only rather small steering corrections. In this case, the differential pressure in the pressure chamber 71 keeps the piston valve 60 in its final position to the right according to FIG. 9. The rotary slide member 10 is only rotated through a small angle of rotation in the direction of the arrow in FIG. 7. When this happens, the guide groove 24 cuts into all windows 51, 52, 53 and 57, so that relatively large overlapped cross-sections of the return drilled holes 11, 12, 13 and 17 come into being. Since the entire return cross-section of the return drilled holes 11, 12, 13 is open as a result of the final position of the piston valve 60, the pressure in the active pressure chamber 30 rises only slowly because of the angle of rotation. Therefore the operating power at the steering wheel is higher. In regard to this, the characteristic curve Z in FIG. 10 shows the path of the increase of pressure.

Any characteristic curves at all matching the current driving condition come into being between the extreme characteristic curves Y and Z in accordance with the position of the piston valve 60 and the rotation position of the rotary slide valve. In this way, variable valve characteristic curves are obtained. The selected special contour of the individual windows—51 to 57, for example—for triggering the working pressure and setting the position of the return drilled holes —11, 12, 13 and 17, for example—in relation to the piston valve 60 is such that an almost infinitely variable modification of the characteristic curve results.

Figure 11:
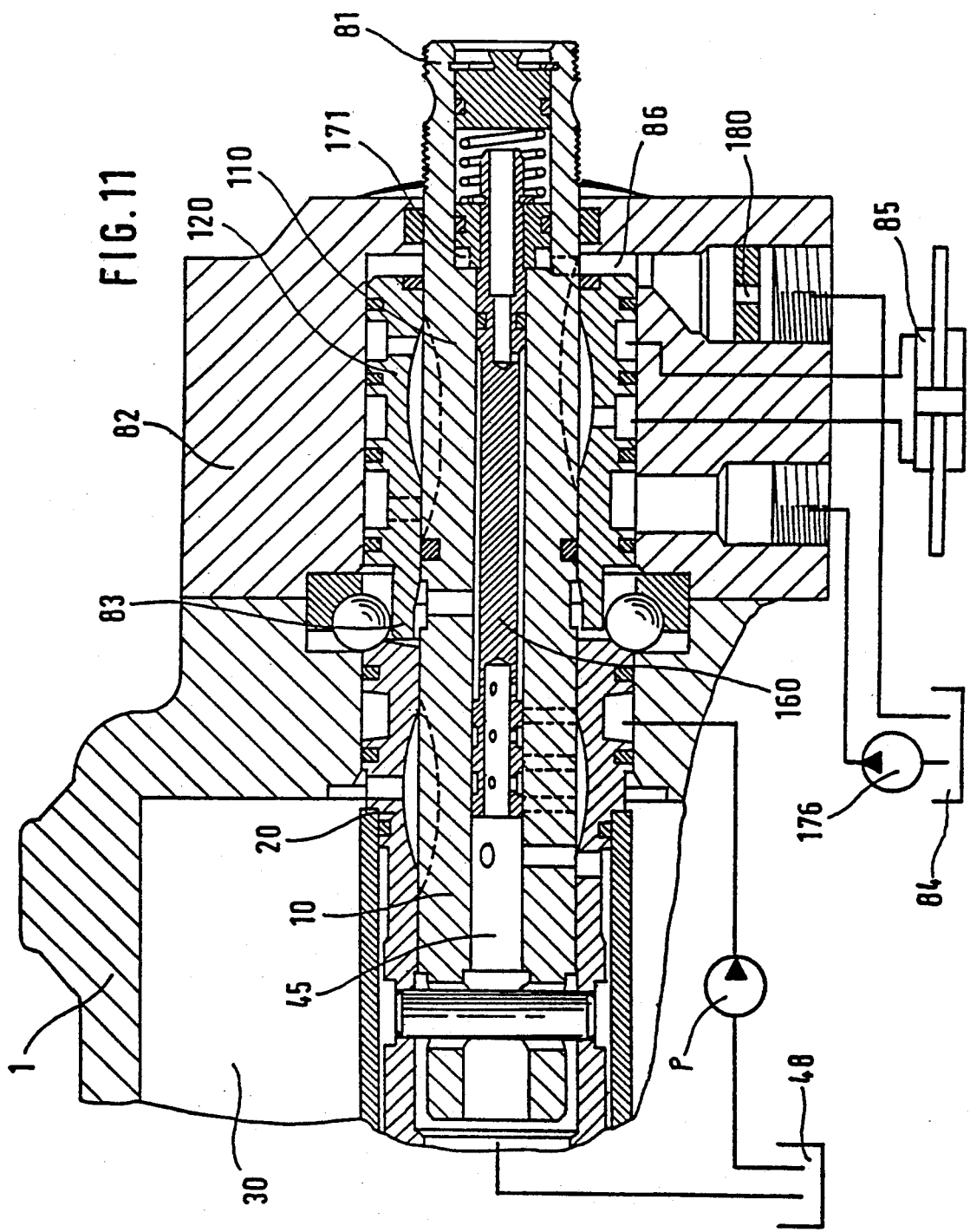
FIG. 11 shows a partial longitudinal section through a two-circuit steering mechanism according to a preferred embodiment.

FIG. 11 shows the use of the invention in a two-circuit steering mechanism. In this mechanism, the block steering gear, as described with the help of FIGS. 1 and 2, constitutes the first steering circuit, so that this part of the steering mechanism is not shown in the drawing any longer. A steering shaft 81 is extended and led through a housing 82 flanged to the transmission case 1. In addition to the rotary slide member 10, the steering shaft 81 also carries another rotary slide member 110. The rotary slide member 110 works together with a valve sleeve 120 that engages in a recess in the threaded spindle 20 for synchronization of rotation by means of a catch 83. The engine-driven pump 36 sucks oil out of the container 48 and conveys it, while steering is being performed, into one of the pressure chambers 30 or 31 by way of the rotary slide valve. The above-mentioned structural parts belong to the first steering circuit. Another pump 176—but one that depends upon the vehicle's speed—sucks oil out of another container 84 and is connected, through the second rotary slide valve 110, 120, with a separate working cylinder 85 connected with the steering linkage. These latter structural parts belong to the second steering circuit. In a fully operative steering mechanism, the rotary slide valve of the second steering circuit does not trigger any pressure in the working cylinder 85. If the first steering circuit breaks down, because of a broken line, for example, the driver must rotate the steering shaft 81 even harder until the control groove system of the rotary slide valve of the second steering circuit triggers a pressure in the working cylinder 85. This delayed coming into action of the second rotary slide valve can be achieved in a known way, for example, by letting the guide channels of the guide grooves located opposite each other be made somewhat wider.

The rotary slide member 10 belonging to the first steering circuit has the same return drilled hole system with corresponding windows as has already been described in connection with FIGS. 3 to 9. However, the essential difference consists of the fact that the piston valve 160 run in the concentric drilled hole 45 in the rotary slide member 10 is passed through the rotary slide member 110 of the second steering circuit. A surge or pressure chamber 171 in the piston valve 160 is connected with a return channel 86 of the pump 176 of the second steering circuit. For the actuating pressure in the pressure chamber 171 that is dependent upon speed to develop, a throttle 180 is provided. Thus the pump 176 running proportionally to the vehicle's speed performs the additional function of a signal transmitter dependent upon speed for the oil-return control mechanism in the first steering circuit.

Figure 12:
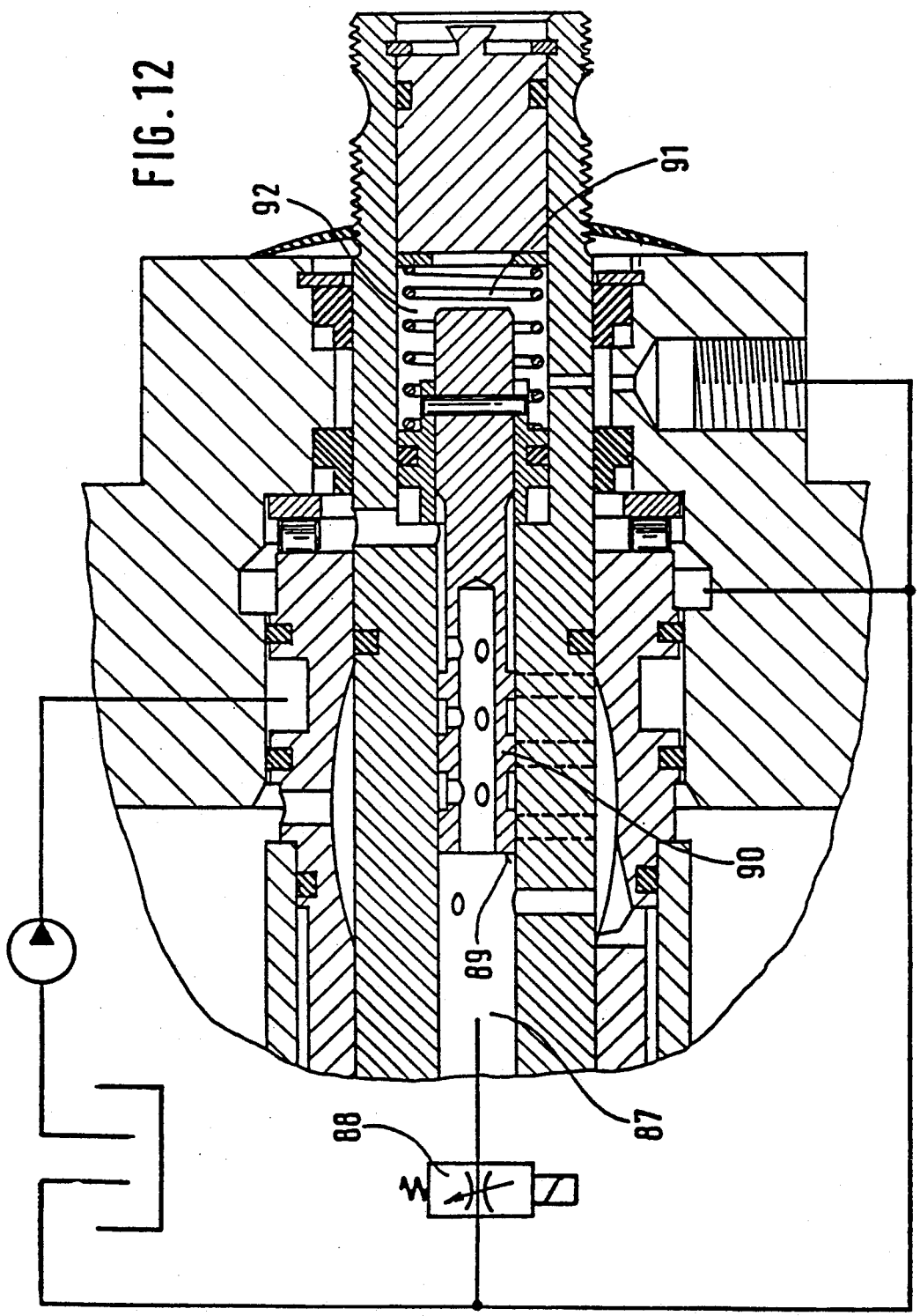
FIG. 12 shows a partial longitudinal section through another embodiment with an electric flow control valve.

FIG. 12 differs from FIG. 2 in that the return flow by-passed through the concentric drilled hole 87 can be dammed up by an electrically-activated flow control valve 88. This flow control valve 88 receives electrical signals from a control device that processes incoming information on various influencing variables (for example, useful load, transverse acceleration and speed). As a result of the damming up of the return flow, a force of pressure acting on the face 89 of the piston valve 90 comes into being that moves it in the direction of the spring 91. The space 92 is released for return flow behind the flow control valve 88.

We claim:

1. A rotary valve for hydraulic auxiliary power steering mechanisms for motor vehicles includes an axial fixed valve sleeve (20) integral with a threaded spindle (5), a rotary member (10) arranged within the valve sleeve and flexibly connected therewith via a torsion bar (4), the valve sleeve containing a plurality of longitudinal grooves (21, 22, 23, 24, 25, 26) in the inner surface thereof and the rotary member containing a plurality of longitudinal grooves (6, 7, 8) in the outer surface thereof, the grooves cooperating to control the pressure of hydraulic fluid guided therethrough for a power cylinder or the steering mechanism, the rotary member containing an axial bore (45) and a plurality of radial bores (11, 12, 13, 14, 15, 16) affording fluid communication between the axial bore and a tank for the return flow of hydraulic fluid from said rotary valve, the improvement which comprises
(a) the radial bores being arranged in two radially spaced longitudinal rows, the bores of each row being spaced longitudinally;
(b) each row of bores corresponding to one of the grooves in the valve sleeve; and
(c) a piston valve (60) slidably arranged within the rotary member, the displacement of said piston valve serving to selectively open and close the radial bores of the rotary member, thereby to alter the pressure of the hydraulic fluid in order to provide variable operating forces to the motor vehicle steering wheel.

2. Apparatus as defined in claim 1, wherein said piston valve contains
(1) an axial bore (64) in an end thereof which is open toward the rotary member axial bore; and
(2) annular grooves (61, 62, 63) connected with said axial bore and arranged in the outer surface of said piston valve, said grooves being spaced a distance corresponding to the longitudinal spacing of the rotary member radial bores, said grooves communicating with a first group of the radial bores when said piston valve is in a first position and with a second group of radial bores when said piston valve is in a second position, the rotary member further including a median bore which is always open and which is arranged between said rows of bores.

3. Apparatus as defined in claim 1, wherein the rotary member radial return bores each include a flat portion (51, 52, 53, 54, 55, 56), said flat portions each having different widths and circumferential lengths, at least one of the flat portions having a sloping outer contour, the rows of rotary member radial bores being spaced by an arm (58) extending therebetween, and said median bore including a flat portion (57) operative in both directions of rotation.

4. Apparatus as defined in claim 3, wherein said median bore flat portion has the shortest circumferential length.

5. Apparatus as defined in claim 1, wherein said piston valve includes an annular attachment (70) which with the rotary member defines a surge chamber (71), said surge chamber being connected with a pump (75) and including a downstream throttle (80).

6. A rotary valve arrangement for hydraulic auxiliary power steering mechanisms having two independent steering circuits including a pair of rotary valves axially arranged in succession on a shaft of the steering mechanism, each valve ancluding an axial fixed valve sleeve integral with a threaded spindle and a rotary member arranged therein, a pump and power cylinder connected with each rotary member to define first and second steering circuits, the first steering circuit being driven by the engine of a motor vehicle and the second steering circuit being driven by an output-side drive, each rotary member containing a plurality of radial bores communicating with a hydraulic fluid tank, the improvement which comprises
(a) a piston valve (160) connected with the first steering circuit for controlling the return cross section of the rotary member radial bores of the first circuit; and (b) an output-side driven pump (176) connected with the second steering circuit for controlling the operation of the piston valve.

7. Appparatus as defined in claim 1, and further comprising an electrically activated flow control valve (88) arranged downstream of said piston valve for producing a dynamic pressure on said piston valve to displace the same.

8. A rotary valve arrangement for hydraulic auxiliary power steering mechanisms having two independent steering circuits including a pair of rotary valves axially arranged in succession on a shaft of the steering mechanism, each valve including an axial fixed valve sleeve integral with a threaded spindle and a rotary member arranged therein, a pump and power cylinder connected with each rotary member to define first and second steering circuits, the first steering circuit being driven by the engine of a motor vehicle and the second steering circuit being driven by an output-side drive, each rotary member containing a plurality of radial bores communicating with a hydraulic fluid tank, the improvement which comprises (a) a piston valve (106) connected with the first steering circuit for controlling the return cross section of the rotary member radial bores of the first circuit, said piston valve including an extension which passes through the second circuit rotary member, said extension including an annular attachment defining a surge chamber (171) with the rotary member, and further comprising a throttle (180) installed downstream of said chamber; and (b) an output-side driven pump (176) connected with the second steering circuit for controlling the operation of the piston valve.

9. A rotary valve arrangement for hydraulic auxiliary power steering mechanisms having two independent steering circuits including a pair of rotary valves axially arranged in succession on a shaft of the steering mechanism, each valve including an axial fixed valve sleeve integral with a threaded spindle and a rotary member arranged therein, a pump and power cylinder connected with each rotary member to define first and second steering circuits, the first steering circuit being driven by the engine of a motor vehicle and the second steering circuit being driven by an output-side drive, each rotary member containing a plurality of radial bores communicating with a hydraulic fluid tank, the improvement which comprises (a) a piston valve (160) connected with the first steering circuit for controlling the return cross section of the rotary member radial bores of the first circuit;

(b) an output-side driven pump (176) connected with the second steering circuit for controlling the operation of the piston valve;

(c) the radial bores being arranged in two radially spaced parallel rows, the bores of each row being spaced longitudinally, each of the rows corresponding to a guide groove contained in the valve sleeve connected with the power cylinder of the first circuit, the radial bores including flat portions (51, 52, 53, 54, 55, 56) and the bores of each row being hydraulically separated by a longitudinal arm; and (d) a median radial bore (17) arranged between the rows of bores and including a flat portion (57) operative in both directions of rotation.

* * * * *